(12) United States Patent
Kowalczyk et al.

(10) Patent No.: US 8,005,293 B2
(45) Date of Patent: Aug. 23, 2011

(54) GRADIENT BASED TRAINING METHOD FOR A SUPPORT VECTOR MACHINE

(75) Inventors: Adam Kowalczyk, Glen Waverley (AU); Trevor Bruce Anderson, Cammeray (AU)

(73) Assignee: Telestra New Wave Pty Ltd, Melbourne, Victoria (AU)

( * ) Notice: Subject to any disclaimer, the term of this patent is extended or adjusted under 35 U.S.C. 154(b) by 1525 days.

(21) Appl. No.: 10/257,929

(22) PCT Filed: Apr. 11, 2001

(86) PCT No.: PCT/AU01/00415
§ 371 (c)(1),
(2), (4) Date: Apr. 15, 2003

(87) PCT Pub. No.: WO01/77855
PCT Pub. Date: Oct. 18, 2001

(65) Prior Publication Data
US 2003/0158830 A1 Aug. 21, 2003

(30) Foreign Application Priority Data
Apr. 11, 2000 (AU) ........................... PQ6844

(51) Int. Cl.
*G06K 9/62* (2006.01)
*G06F 15/18* (2006.01)
(52) U.S. Cl. ............................. 382/155; 706/12
(58) Field of Classification Search .......... 382/155–161, 382/225, 253; 706/12–14
See application file for complete search history.

(56) References Cited

U.S. PATENT DOCUMENTS

| | | | |
|---|---|---|---|
| 5,640,492 A | 6/1997 | Cortes et al. | |
| 5,649,068 A * | 7/1997 | Boser et al. | 706/12 |
| 5,950,146 A * | 9/1999 | Vapnik | 702/153 |
| 6,112,195 A * | 8/2000 | Burges | 706/20 |
| 6,134,344 A | 10/2000 | Burges | |
| 6,192,360 B1 | 2/2001 | Dumais et al. | |
| 6,714,925 B1 * | 3/2004 | Barnhill et al. | 706/48 |
| 6,760,715 B1 * | 7/2004 | Barnhill et al. | 706/16 |
| 6,789,069 B1 * | 9/2004 | Barnhill et al. | 706/12 |
| 6,882,990 B1 * | 4/2005 | Barnhill et al. | 706/16 |
| 6,990,217 B1 * | 1/2006 | Moghaddam et al. | 382/118 |
| 7,117,188 B2 * | 10/2006 | Guyon et al. | 706/20 |
| 7,318,051 B2 * | 1/2008 | Weston et al. | 706/12 |

(Continued)

FOREIGN PATENT DOCUMENTS
WO WO 99/57622 A2 11/1999

OTHER PUBLICATIONS

N. Christianini et al., "An Introduction to Support Vector Machines and other Kernel-Based Learning Methods", Cambridge University Press, Cambridge 2000.

(Continued)

*Primary Examiner* — Aaron W Carter
(74) *Attorney, Agent, or Firm* — Nixon Peabody LLP

(57) ABSTRACT

A training method for a support vector machine, including executing an iterative process on a training set of data to determine parameters defining the machine, the iterative process being executed on the basis of a differentiable form of a primal optimization problem for the parameters, the problem being defined on the basis of the parameters and the data set.

10 Claims, 7 Drawing Sheets

U.S. PATENT DOCUMENTS

| | | | |
|---|---|---|---|
| 7,444,308 B2 * | 10/2008 | Guyon et al. | 706/12 |
| 7,475,048 B2 * | 1/2009 | Weston et al. | 706/20 |
| 7,542,959 B2 * | 6/2009 | Barnhill et al. | 706/48 |
| 7,797,257 B2 * | 9/2010 | Barnhill et al. | 706/13 |
| 7,805,388 B2 * | 9/2010 | Weston et al. | 706/20 |
| 2005/0165556 A1 * | 7/2005 | Barnhill et al. | 702/19 |
| 2008/0033899 A1 * | 2/2008 | Barnhill et al. | 706/48 |
| 2008/0059392 A1 * | 3/2008 | Barnhill et al. | 706/13 |
| 2008/0097939 A1 * | 4/2008 | Guyon et al. | 706/12 |
| 2008/0233576 A1 * | 9/2008 | Weston et al. | 435/6 |
| 2010/0256988 A1 * | 10/2010 | Barnhill et al. | 705/2 |

OTHER PUBLICATIONS

C. Burgess, "A Tutorial on Support Vector Machines for Pattern Recognition", Data Mining and Knowledge Discovery, 2, Kluwer Academic Publishers, 1998, pp. 121-167.

V. Cherkassky et al., "Learning from Data", John Wiley and Sons, Inc., 1998.

V. Vapnik, "Statistical Learning Theory", John Wiley and Sons, Inc. 1998.

* cited by examiner

GRADIENT BASED TRAINING METHOD FOR A SUPPORT VECTOR MACHINE

The present invention relates to a training method for a support vector machine.

Computer systems can be configured as learning machines that are able to analyse data and adapt in response to analysis of the data, and also be trained on the basis of a known data set. Support Vector Machines ("SVMs"), for instance, execute a supervised learning method for data classification and regression. Supervised methods refer to tasks in which a machine is presented with historical data with known labels, i.e. good customers vs bad customers, and then the machine is trained to look for patterns in the data. SVMs represent a recent development in "neural network" algorithms and have become increasingly popular over the past few years. Essentially these machines seek to define a decision surface which gives the largest margin or separation between the data classes whilst at the same time minimising the number of errors. This is usually accomplished by solving a specific quadratic optimisation problem.

In the simplest linear version, the output of the SVM is given by the linear function $$y = w \cdot x + \beta b \quad (1)$$

or its binarised form $$y = sgn(w \cdot x + \beta b) \quad (2)$$

where the vector w defines the decision surface, x is the input data, y is the classification, $\beta$ is a constant that acts on a switch between the homogeneous ($\beta=0$) and the non-homogeneous ($\beta=1$) case, b is a free parameter usually called bias and "sgn" denotes the ordinary signum function, i.e. $sgn(\xi)=1$ for $\xi>0$, $sgn(\xi)=-1$ for $\xi<1$ and $sgn(0)=0$. Typically, the first of these two forms is used in regression (more precisely, the so-called $\epsilon$-insensitive regression), and the other in classification tasks. The problem is in fact more subtle than this because training the machine ordinarily involves searching for a surface in a very high dimensional space, and possibly infinite dimensional space. The search in such a high dimensional space is achieved by replacing the regular dot product in the above expression with a nonlinear version. The nonlinear dot product is referred to as the Mercer kernel and SVMs are sometimes referred to as kernel machines. Both are described in V. Vapnik, Statistical Learning Theory, J. Wiley, 1998, ("Vapnik"); C. Burges, *A Tutorial on Support Vector Machines for Pattern Recognition*, Data Mining and Knowledge Discovery, 2, 1998, ("Burges"); V. Cherkassky and F. Mulier, *Learning From Data*, John Wiley and Sons, Inc., 1998; and N. Christinini and J. Shawe-Taylor, 2000, *An Introduction to Support Vector Machines and other Kernel-Based Learning Methods*, Cambridge University Press, Cambridge 2000.

Most solutions for the optimisation problem that are required to train the SVMs are complex and computationally inefficient. A number of existing training methods involve moving the optimisation problem to another domain to remove a number of constraints on the problem. This gives rise to a dual problem which can be operated on instead of the primal problem and currently the fastest training methods operate on the dual problem. It is desired however to provide a training method which is more efficient and alleviates difficulties associated with operating on the dual problem, or at least provides a useful alternative.

The present invention relates to a training method for a support vector machine, including executing an iterative process on a training set of data to determine parameters defining said machine, said iterative process being executed on the basis of a differentiable form of a primal optimisation problem for said parameters, said problem being defined on the basis of said parameters and said data set.

Advantageously, the training method can be adapted for generation of a kernel support vector machine and a regularisation networks.

The usage of a differentiable form of the optimisation problem is particularly significant as it virtually removes the explicit checking of constraints associated with an error penalty function.

Preferably, in the case of classification, and for the SVM, $$y = sgn(w \cdot x + \beta b),$$

where y is the output, x is the input data, $\beta$ is 0 or 1, the vector w and bias b defining a decision surface is obtained as the argument by minimising the following differentiable objective function:

$$\Psi(w, b) = \frac{1}{2} w \cdot w + C \sum_{i=1}^{n} L(1 - y_i(w \cdot x_i + \beta b))$$

where $C > 0$ is a free parameter, $x_i$, $i=1, \ldots, n$, being the data points, $y_i = \pm 1$, $i=1, \ldots, n$, being the known labels, n being the number of data points and L being a differentiable loss function such that $L(\epsilon) = 0$ for $\epsilon \leq 0$. The said iterative process preferably operates on a derivative of the objective function $\Psi$ until the vectors converge to a vector w defining the machine. Preferably, for $\epsilon$-insensitive regression, the differentiable form of the optimisation problem is given as minimisation of the functional $$\Psi(w, b) = \frac{1}{2} w \cdot w + C \sum_{i=1}^{n} L(|y_i - w \cdot x_i + \beta b| - \epsilon)$$

where the $\epsilon > 0$ is a free parameter.

The present invention also provides a support vector machine for a classification task having an output y given by $$y = y(x) = \sum_{i=1}^{n} y_i \alpha_i k(x_i, x_j) + \beta b$$

where $x \in R^m$ is a data point to be classified and $x_i$ are training data points, k is a Mercer kernel function as described in Vapnik and Burges, and $\alpha_i$ are coefficients determined by $$\alpha_i = CL'(1 - y_i \eta_i - \beta b)$$

where $L'(\xi)$ is the derivative of the loss and the values $\eta_i$ are determined by iteratively executing $$\eta_j^{t+1} = \eta_j^t - \delta\left(\eta_j^t - C \sum_{i=1}^{n} L'(1 - y_i \eta_j^t - y_i \beta b^t) y_i k(x_i, x_j)\right),$$

$$b^{t+1} = \beta b^t + \delta \beta C \sum_{i=1}^{n} L'(1 - y_i \eta_j^t - y_i \beta b^t) y_i.$$

where $\delta > 0$ is a free parameter (a learning rate) and/or, in the homogeneous case ($\beta = 0$) by iteratively executing:

$$\eta_j^{t+1} C \sum_{i=1}^{n} L'(1 - y_i \eta_j^t) y_i k(x_i, x_j).$$

where i, j=1, . . . , n, n being the number of data points, t represents an iteration and L' is the derivative of the loss function L.

The present invention also provides a support vector machine for ϵ-regression having output y given by $$y(x) = \sum_{i=1}^{n} \beta_i k(x, x_i) + \beta b$$

where $x \in R^m$ is a data point to be evaluated and $x_i$ are training data points, k is the Mercer kernel function, $\beta=0$ or 1, and $\beta_i$ and bias b are coefficients determined by $$\beta_i = CL'(|y_i - \eta_i - \beta b| - \epsilon) sgn(y_i - \eta_i - \beta b)$$

where ϵ is a free parameter and the values $\eta_i$, and b are determined by iteratively executing $$\eta_j^{t+1} = \eta_j^t - \delta\left(\eta_j^t - C\sum_{i=1}^{n} L'(|y_i - \eta_i^t - \beta b| - \epsilon) \operatorname{sgn}(y_i - \eta_i^t - \beta b) k(x_i, x_j)\right)$$

$$b^{t+1} = b^t + \delta\beta C \sum_{i=1}^{n} L'(|y_i - \eta_i^t - \beta b| - \epsilon) \operatorname{sgn}(y_i - \eta_i^t - \beta b)$$

where δ>0 is a free parameter (learning rate) and/or, in the homogeneous case (β=0) by iteratively executing:

$$\eta_j^{t+1} = C \sum_{i=1}^{n} L'(|y_i - \eta_i^t| - \epsilon) \operatorname{sgn}(y_i - \eta_i^t) k(x_i, x_j).$$

where i, j=1, . . . , n, n being the number of data points and t represents an iteration.

Preferred embodiments of the present invention are hereinafter described, by way of example only, with reference to the accompanying drawings, wherein.

Figure 1:
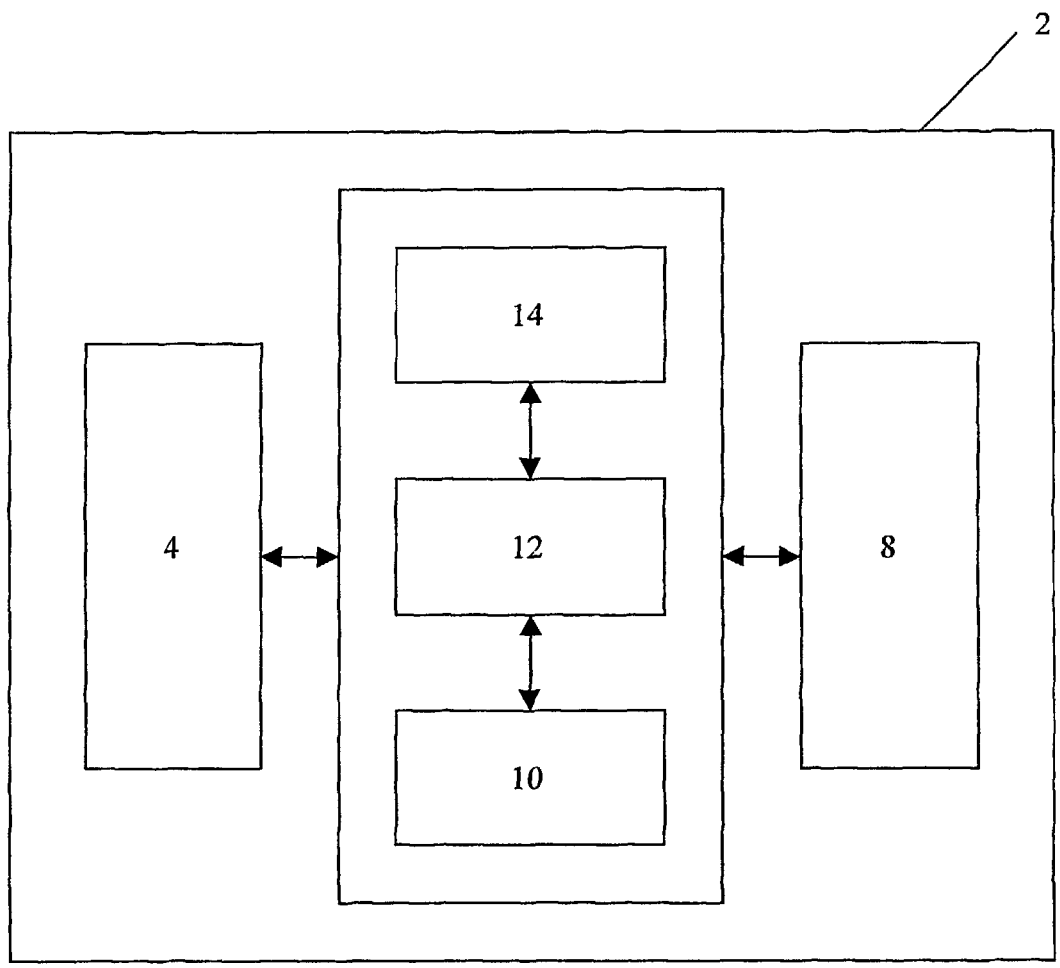
FIG. 1 is a block diagram of a preferred embodiment of a support vector machine.

A Support Vector Machine (SVM) 2 is implemented by a computer system 2 which executes data analysis using a supervised learning method for the machine. The computer system 2 of the Support Vector Machine includes a processing unit 6 connected to at least one data input device 4, and at least one output device 8, such as a display screen. The input device 4 may include such data input devices as a keyboard, mouse, disk drive etc for inputting data on which the processing unit can operate. The processing unit 6 includes a processor 10 with access to data memory 12, such as RAM and hard disk drives, that can be used to store computer programs or software 14 that control the operations executed by the processor 10. The software 14 is executed by the computer system 2. The processing steps of the SVM are normally executed by the dedicated computer program or software 14 stored on a standard computer system 2, but can be executed by dedicated hardware circuits, such as ASICs. The computer system 2 and its software components may also be distributed over a communications network. The computer system 2 may be a UNIX workstation or a standard personal computer with sufficient processing capacity to execute the data processing step described herein.

The primal problem for an SVM is discussed in Vapnik. In the case of classification the exact form of the problem is as follows.

Given labelled training data $(x_1, y_1), \ldots, (x_n, y_n)$, $x \in R^m$, $Y \in R^m$, $y \in \{-1, 1\}$, the primal problem is to minimise $$\Psi(w) = \frac{1}{2} w \cdot w + C \sum_{i=1}^{n} \tilde{L}(\xi_i) \qquad (3)$$

subject to $$y_i(w \cdot x_i) \geq 1 - \xi_i \text{ and } \xi_i \geq 0 \; i = 1, \ldots, n. \qquad (4)$$

Here $\tilde{L}$ is a convex loss function; the $\xi_i$s represent errors and are often referred to as slack variables and C>0 is a free parameter. The typical examples of loss function are of the form $\tilde{L}(\xi) = \xi^p$, where $p \geq 1$.

Figure 2:
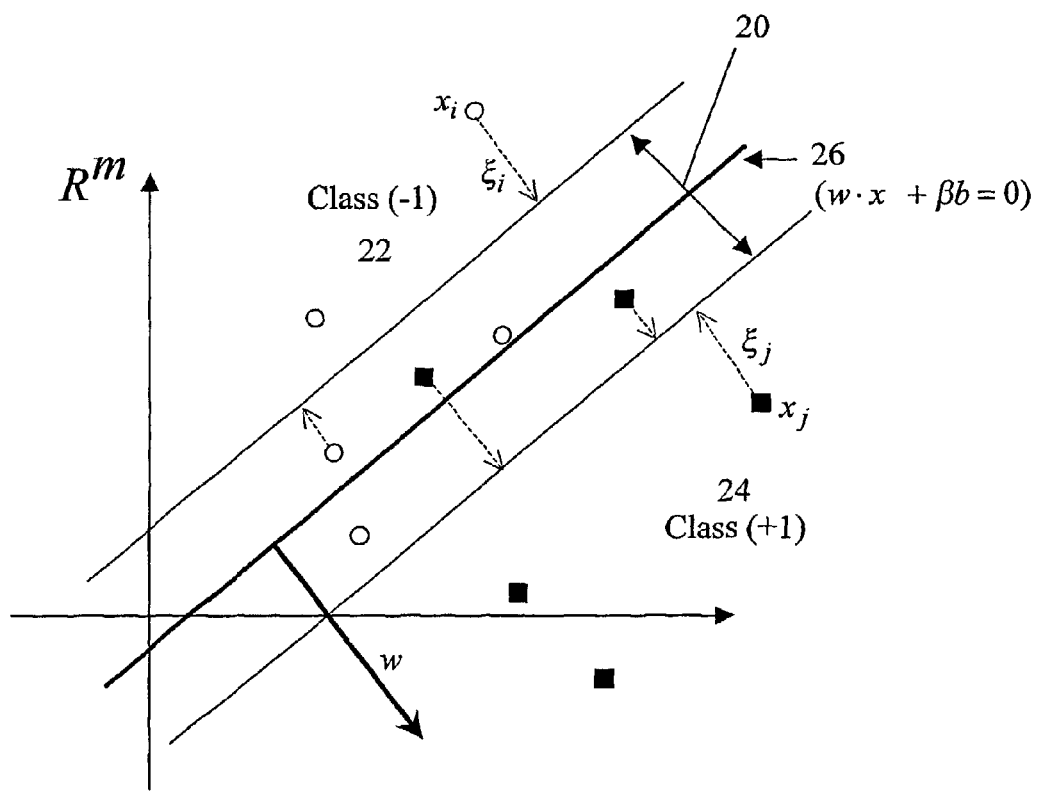
FIG. 2 is a graph illustrating an optimal hyperplane established by the support vector machine for linear classification.

The first term on the right hand side of equation (3) controls the margin 20 between the data classes 22 and 24, as shown in FIG. 2, while the second term describes the error penalty. The primal problem is an example of a constrained quadratic minimisation problem. A common approach when dealing with constraints is to use the method of Lagrange multipliers. This technique typically simplifies the form of constraints and makes the problem more tractable.

Currently the fastest available training methods for the SVM operate on a dual problem for the case of linear loss (p=1), with inherent complexity and efficiency problems.

To alleviate these difficulties, the inventors have developed a training method which solves the primal problem directly. To achieve this it has been determined that the optimisation task (3 and 4) can be rewritten as a minimisation of the objective function $$\Psi(w) = \frac{1}{2} w \cdot w + C \sum_{i=1}^{n} L(1 - y_i w \cdot x_i) \qquad (5)$$

where the (modified loss) $L(\chi) = \tilde{L}(\max(0, \chi))$ is obtained after a direct substitution for the slack variable $\xi_i = \max(0, 1 - y_i w \cdot w_i)$, for i=1, 2, . . . , n. The modified loss $L(\chi)$ is assumed to be 0 for $\chi \leq 0$. In this form the constraints (4) do not explicitly appear and so as long as equation (5) is differentiable, standard techniques for finding the minimum of an unconstrained function may be applied. This holds if the loss function L is differentiable, in particular for $L(\chi) = \max(0, \chi)^p$ for p>1. For non-differentiable cases, such as the linear loss function $L(\chi) = \max(0, \chi)$, a simple smoothing technique can be employed, e.g. a Huber loss function could be used, as discussed in Vapnik. The objection function is also referred to as a regularised risk.

$$L(\xi) = \begin{cases} 0 & \text{for } \xi \le 0, \\ \xi^2/4\delta & \text{for } 0 < \xi \le \delta, \\ \xi - \delta & \text{otherwise.} \end{cases}$$

Two methods for minimising equation (5) are given below. They are derived from the explicit expression for the gradient of the function:

$$\nabla_w \Psi = w - C\sum_{i=1}^{n} y_i x_i L'(1 - y_i(x_i \cdot w + \beta b)), \quad (6)$$

$$\nabla_b \Psi = -C\beta \sum_{i=1}^{n} y_i L'(1 - y_i(x_i \cdot w + \beta b)).$$

The first method executes a gradient descent technique to obtain the vector w iteratively using the following:

$$w^{t+1} = w^t - \delta \nabla_w \Psi \quad (7)$$
$$= w^t - \delta\left(w^t - C\sum_{i=1}^{n} L'(y_i - w^t \cdot x_i - \beta b)x_i\right),$$
$$b^{t+1} = b^t - \delta \nabla_b \Psi$$
$$= b^t + \delta\beta C \sum_{i=1}^{n} L'(y_i - w^t \cdot x_i - \beta b)$$

where δ controls the steps size and t represents the "time" or iteration step. The value of the parameter δ can be either fixed or can be made to decrease gradually. One robust solution for p=2 is to use δ calculated by the formula:

$$\delta = \frac{\|\nabla_w \Psi(w^t, b^t)\|^2 + \nabla_b \Psi(w^t, b^t)^2}{\|\nabla_w \Psi(w^t, b^t)\|^2 + 2C\sum_{i=1; y_i(w \cdot x_i + \beta b^t) < 1}(x_i \cdot \nabla_w \Psi(w^t, b^t) + \nabla_b \Psi(w^t, b^t))^2}$$

where $\nabla_w \Psi$ and $\Box_b \Psi$ are calculated from (6) simplify $$\nabla_w \Psi = w - 2C\sum_i y_i(1 - y_i w \cdot x_i - y_i \beta b)x_i,$$

$$\nabla_b \Psi = w - 2C\beta \sum_i y_i(1 - y_i w \cdot x_i - y_i \beta b)$$

with summation taken over all indices i such that $y_i(1-y_i w \cdot x_i - y_i \beta b) > 0$.

The second method, valid in the homogeneous case of β=0, is a fixed point technique which involves simply setting the gradient of equation (6) to zero, and again solving for the vectors w iteratively. Accordingly, with $\nabla_w \Psi = 0$ this allows the minimum of equation (5) to be found using:

$$w^{t+1} = C\sum_{i=1}^{n} L'(1 - y_i w^t \cdot x_i)y_i x_i. \quad (8)$$

The iterative training process of equation (8) can, in some instances, fail to converge to a set of vectors, but when it does converge it does very rapidly. The training process of equation (7) is not as rapid as that of equation (8), but it will always converge provided δ is sufficiently small. The two processes can be executed in parallel to ensure convergence to a set of vectors for an SVM.

Figure 3:
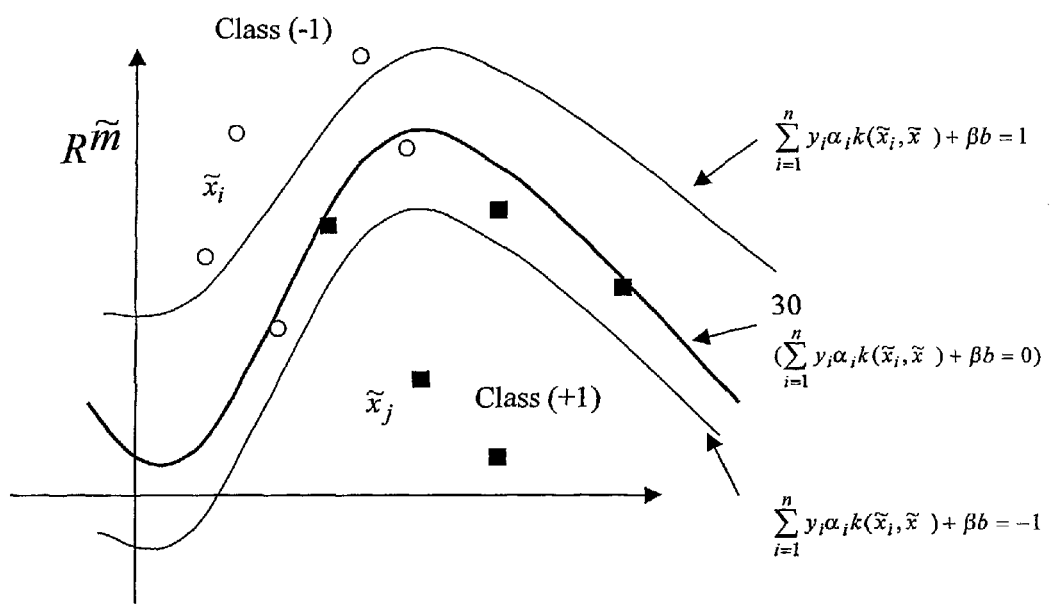
FIG. 3 is a graph of a hypersurface established by the support vector machine for a non-linear classification.

The training processes of equations (7) and (8) involve searching for "separating" hyperplanes in the original input space of actual m-dimensional observations $x_i$, such as the optimal hyperplane 26 shown in FIG. 2 where $\xi = 1 - y_i(w \cdot x_i + \beta b)$. This approach can be extended to search for a hyperplane in a high dimensional or even infinite dimensional space of feature vectors. This hyperplane corresponds to a non-linear surface in the original space, such as the optimal hypersurface 30 shown in FIG. 3.

In many situations of practical interest the data vectors $x_i \in R^m$ live in a very high dimensional space, m>>1, or possibly m=∞. However, often they can be parameterised by lower dimensional observation vectors $\tilde{x}_i \in R^{\tilde{m}}$, $x_i = \Phi(\tilde{x}_i)$, with the property that the dot products can be calculated by an evaluation of a Mercer kernel function k, i.e.:

$$x_i \cdot x_j = \Phi(\tilde{x}_i) \cdot \Phi(\tilde{x}_j) = k(\tilde{x}_i, \tilde{x}_j). \quad (9)$$

The Mercer kernel function is discussed in Vapnik and Burges. Vectors $\tilde{x}_i$ are actual observations, while 'feature' vectors $x_i$ are conceptual, but not directly observable, in this context. In such a case, the vector w determining the optimal hyperplane in the features space cannot be practically represented explicitly by a computer system. The way around this obstacle is to use the "data expansion" of the optimal solution $$w = \sum_{i=1}^{n} y_i \alpha_i x_i = \sum_{i=1}^{n} y_i \alpha_i \Phi(\tilde{x}_i). \quad (10)$$

where $\alpha_i \geq 0$ (referred to as Lagrange multipliers). The optimal SVM is uniquely determined by those coefficients, because for any vector $\tilde{x}_i \in R^{\tilde{m}}$, $$y(\tilde{x}) = w \cdot \Phi(\tilde{x}) = \sum_{i=1}^{n} y_i \alpha_i k(\tilde{x}_i, \tilde{x})$$

Taking advantage of this property, the above training processes are reformulated as follows. Instead of searching for w directly, the dot products $w \cdot x_i = w \cdot \Phi(\tilde{x}_i)$ for i=1, 2, . . . , n are searched for and are found by taking the dot product on both sides of equations (7) and (8), respectively. In the case of gradient descent method, this gives rise to:

$$w^{t+1} \cdot x_j = \quad (11)$$

$$w^t \cdot x_j - \delta\left(w^t \cdot x_j - C\sum_{i=1}^{n} L'(1 - y_i w^t \cdot x_i - y_i \beta b^t)y_i x_i \cdot x_j\right)$$

leading to the "non-linear" version of gradient descent process being $$\eta_j^{t+1} = \eta_j^t - \delta(\eta_j^t - C\sum_{i=1}^{n} L'(1 - y_i\eta_j^t)y_i k(\tilde{x}_i, \tilde{x}_j)) \quad (12)$$

where $\eta_j^t = w^t \cdot x_j$ and $\eta_j^{t+1} = w^{t+1} \cdot x_j$ and $\delta > 0$ is a free parameter.

Similarly, the non-linear version of the fixed-point process (for $\beta = 0$) is given by:

$$\eta_j^{t+1} = C\sum_{i=1}^{n} L'(1 - y_i \eta_j^t) y_i k(\tilde{x}_i, \tilde{x}_j). \quad (13)$$

Having used the iterative process defined by equations (12) and (13) to find the optimal values, $\eta_j (j=1, \ldots, n)$, and bias b, the coefficients $\alpha_i$ defined in equation (10) need to be determined. One approach is to solve the system of equations $$\eta_j = \sum_{i=1}^{n} y_i \alpha_i k(\tilde{x}_i, \tilde{x}_j)(j = 1, \ldots, n) \quad (14)$$

but this is computationally difficult, as the problem is invariably singular. A better approach is to note from equation (7) that the coefficients are given by $$\alpha_i = CL'(1 - y_i\eta_i - \beta b) \quad (15)$$

The training processes described above can also be extended for use in establishing an SVM for data regression, more precisely, $\epsilon$-insensitive regression as discussed in Vapnik. Given labelled training data $(x_1,y_1), \ldots, (x_n,y_n) \in R^m \times R$, analogous to equations (3) and (4) the primal problem for regression is to minimise $$\Psi(w) = \frac{1}{2} w \cdot w + C \sum_{i=1}^{n} \tilde{L}(\xi_i) \quad (16)$$

subject to $$|y_i - w \cdot x_i - \beta b| \leq \epsilon + \xi_i \text{ and } \xi_i \geq 0 \text{ for } i=1, \ldots, n, \quad (17)$$

where C, $\epsilon > 0$ are free parameters and L is the loss function as before. This problem is equivalent to minimisation of the following function $$\Psi(w) = \frac{1}{2} w \cdot w + C \sum_{i=1}^{n} L(|y_i - w \cdot x_i - \beta b| - \epsilon) \quad (18)$$

analogous to equation (5) for classification, where as before we define the loss $L(\chi) = \tilde{L}(\max(0, \chi))$. Further in a similar manner to equations (7) and (8), for the linear case the gradient descent process for regression takes the form $$w^{t+1} = w^t - \delta(w^t - C\sum_{i=1}^{n} L'(|y_i - w^t \cdot x_i - \beta b| - \varepsilon)\text{sgn}(y_i - w^t \cdot x_i - \beta b)x_i),$$

$$b^{t+1} = b^t + \delta\beta C\sum_{i=1}^{n} L'(|y_i - w^t \cdot x_i - \beta b| - \varepsilon)\text{sgn}(y_i - w^t \cdot x_i - \beta b)$$

(19)

and the fixed point algorithms for regression becomes:

$$w^{t+1} = C\sum_{i=1}^{n} L'(|y_i - w^t \cdot x_i - \beta b| - \varepsilon)\text{sgn}(y_i - w^t \cdot x_i)y_i x_i \quad (20)$$

Figure 4:
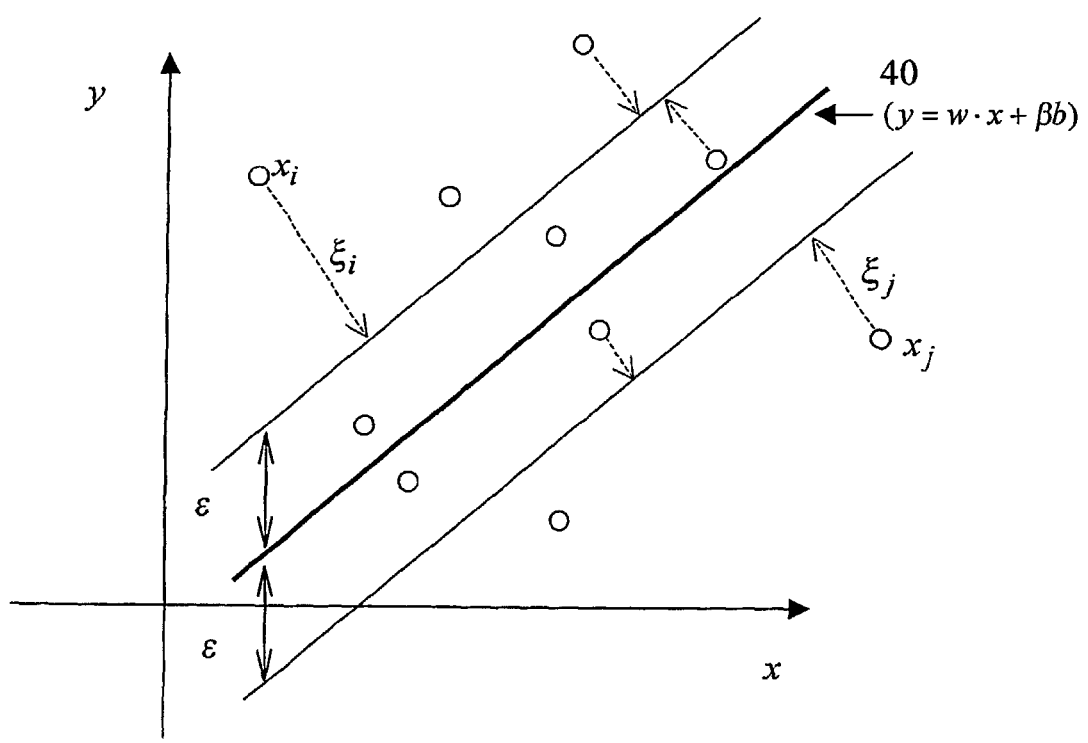
FIG. 4 is a graph of a regression function established by the support vector machine for linear regression.

The above training process can therefore be used to determine a regression function 40, as shown in FIG. 4, for the linear case where the deviation is defined as $\xi_i = |y_i - (w \cdot x_i + \beta b)| - \epsilon$. This is for ($\epsilon$-insensitive) regression.

Figure 5:
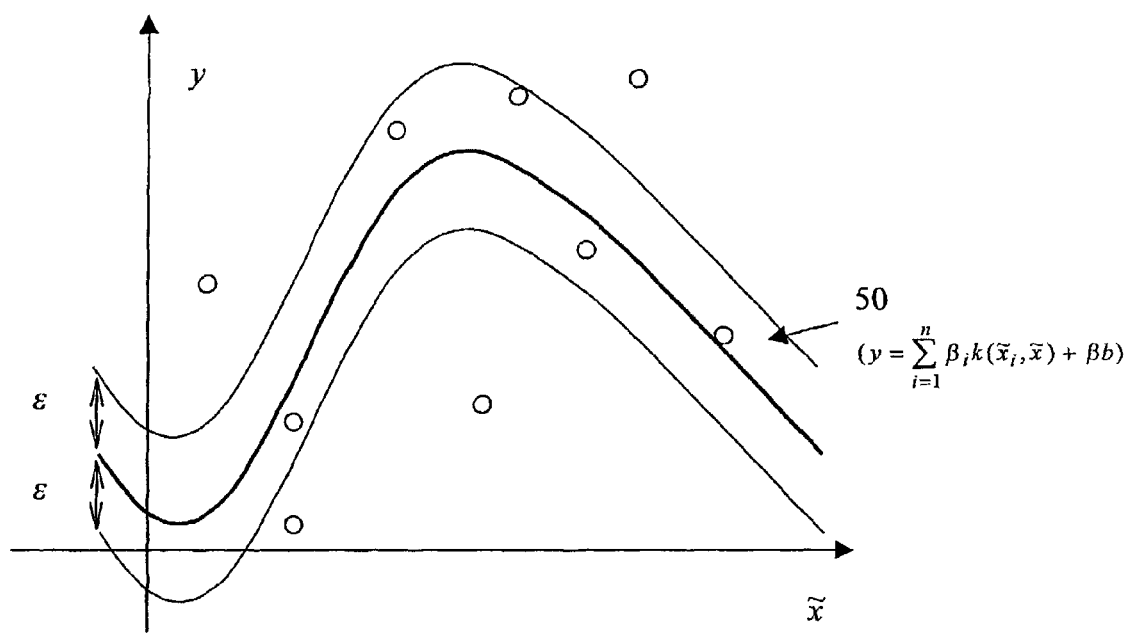
FIG. 5 is a graph of a regression function established by a support vector machine for non-linear regression.
Figure 6:
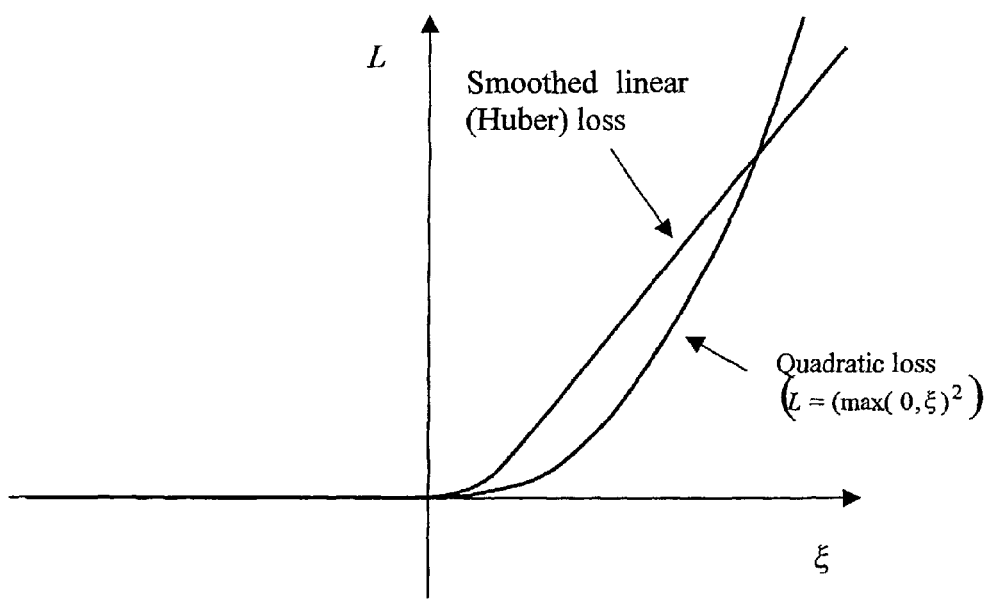
FIG. 6 is a graph of differential loss functions for classification and regression for the support vector machine.
Figure 7:
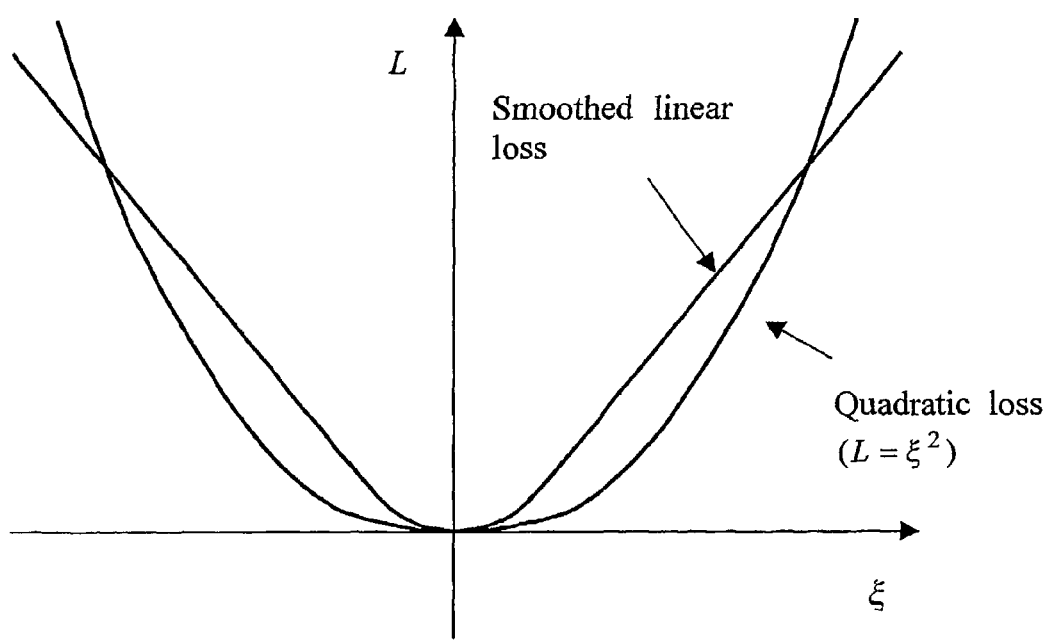
FIG. 7 is a graph of differential loss functions for regularisation networks established by the support vector machine.

The iterative processes (19) and (20) can also be extended to the non-linear (kernel) case to provide a regression function 50, as shown in FIG. 5, defining the optimal hypersurface to give the kernel version of the gradient descent process for regression:

$$\eta_j^{t+1} = \eta_j^t - \delta(\eta_j^t - C\sum_{i=1}^{n} L'(|y_i - \eta_i^t - \beta b| - \varepsilon)\text{sgn}(y_i - \eta_i^t - \beta b)k(\tilde{x}_i, \tilde{x}_j))$$

$$b^{t+1} = b^t + \delta\beta C\sum_{i=1}^{n} L'(|y_i - \eta_i^t - \beta b| - \varepsilon)\text{sgn}(y_i - \eta_i^t - \beta b)$$

and the kernel version of the fixed point algorithm for regression ($\beta = 0$):

$$\eta_j^{t+1} = C\sum_{i=1}^{n} L'(|y_i - \eta_i^t| - \varepsilon)\text{sgn}(y_i - \eta_i^t)k(\tilde{x}_i, \tilde{x}_j)$$

Having derived the optimal values $\eta_j (j=1, \ldots, n)$ and b, i.e. the fixed point $(\eta_1, \ldots, \eta_n)$, from one of the above iterative processes, the optimal SVM regressor function 50 is defined by $$y(\tilde{x}) = \sum_{i=1}^{n} \beta_i k(\tilde{x}, \tilde{x}_i) + \beta b$$

where the coefficients $\beta_i$ (Lagrange multipliers) are derived from the following equation which is analogous to equation (15)

$$\beta_i = CL'(|y_i - \eta_i - \beta b| - \epsilon)sgn(y_i - \eta_i - \beta b)$$

The above techniques are also applicable to another class of learning machines algorithms, referred to as regularisation networks (RNs), as discussed in G. Kimeldorf and G. Wahba, *A correspondence between Bayesian estimation of stochastic processes and smoothing by spines*, Anm. Math. Statist, 1970, 495-502; F. Girosi, M. Jones and T. Poggio, *Regularization Theory and Neural Networks Architectures*, Neural Computation. 1995, 219-269; and G. Wahba, *Support Vector Machines, Reproducing Kernel Hilbert Spaces and the Ran-* domized *GACV*2000, in B. Scholkopf, C. J. Burges and A. Smola, eds., Advances in *Kernel Aethods–Support Vector Learning*, MIT Press, Cambridge, USA, 1998, pp 69-88. The following extends the previous processes to this class of learning machines, given labelled training data $(x_1,y_1), \ldots, (x_n,y_n) \in R^m \times R$. Analogous to equations (3) and (4) RN is defined as the minimiser to an (unconstrained) regularised risk $$\Psi(w) = \frac{\lambda}{2} w \cdot w + \sum_{i=1}^{n} L(\xi_i)$$

$$= \frac{\lambda}{2} w \cdot w + \sum_{i=1}^{n} L(y_i - w \cdot x_i - \beta b)$$

where $\lambda > 0$ is a free parameter (regularisation constant) and L is the convex loss function, e.g. $L(\xi) = \xi^p$ for $p \geq 1$. This problem is equivalent to minimisation of the following functional $$\Psi(w, b) = \frac{1}{2} w \cdot w + C \sum_{i=1}^{n} L(y_i - w \cdot x_i - \beta b)$$

under assumption $\lambda = C^{-1}$. The latest functional has the form of equation (16), and the techniques analogous to those described above can be employed to find its minimum. Analogous to equation (19), in the linear case, the gradient descent algorithm for RN takes the form $$w^{t+1} = w^t - \delta \nabla_w \Psi$$
$$= w^t - \delta \left( w^t - C \sum_{i=1}^{n} L'(y_i - w^t \cdot x_i - \beta b) x_i \right),$$
$$b^{t+1} = b^t - \delta \nabla_b \Psi$$
$$= b^t + \delta \beta C \sum_{i=1}^{n} L'(y_i - w^t \cdot x_i - \beta b)$$

and the fixed point algorithms for RN becomes:

$$w^{t+1} = C \sum_{i=1}^{n} L'(y_i - w^t \cdot x_i - \beta b) x_i$$

Those two algorithms extended to the non-linear (kernel) case yield the kernel version of gradient descent algorithm for RN:

$$\eta_j^{t+1} = \eta_j^t - \delta \left( \eta_j^t - C \sum_{i=1}^{n} L'(y_i - \eta_i^t - \beta b) k(\tilde{x}_i, \tilde{x}_j) \right)$$

$$b^{t+1} = b^t + \delta \beta C \sum_{i=1}^{n} L'(y_i - \eta_i^t - \beta b)$$

and the kernel version of the fixed point algorithm for RN ($\beta = 0$):

$$\eta_j^{t+1} = C \sum_{i=1}^{n} L'(y_i - \eta_i^t - \beta b) k(\tilde{x}_i, \tilde{x}_j)$$

Having found the optimal values $\eta_j$ (j=1, . . . ,n), from the above algorithms, the optimal regressor is defined as $$y(\tilde{x}) = \sum_{i=1}^{n} \beta_i k(\tilde{x}, \tilde{x}_i) + \beta b$$

where the coefficients (Lagrange multipliers) $\beta_i$ are derived from the following equation analogous to equation (15)

$$\beta_i = CL'(y_i - \eta_i - \beta b)$$

One example of the many possible applications for the SVM, is to use the SVM to effectively filter unwanted email messages or "Spam". In any given organisation, a large amount of email messages are received and it is particularly advantageous to be able to remove those messages which are unsolicited or the organisation clearly does not Want its personnel to receive. Using the fast training processes described above, which are able to operate on large data sets of multiple dimensions, several to several hundred emails can be processed to establish an SVM which is able to classify emails as either being bad or good.

The training data set includes all of the text of the email messages and each word or phrase in a preselected dictionary can be considered to constitute a dimension of the vectors.

For instance if $D = \{phrase_1, \ldots, phrase_m\}$ is a preselected dictionary of words and phrases to be looked for, with each email E an mn-dimensional vector of frequencies can be associated $$x = x(E) = (freq_1(E), \ldots, freq_m(E))$$

where $freq_i$ (E) gives the number (frequency) of the phrase $phrase_i$ appeared in the email E. In the classification phase the likelihood of email E being Spam is estimated as $$y(E) = w \cdot x = \sum_{j=1}^{m} w_j freq_j(E)$$

where the vector $w = (w_1, \ldots, w_m)$ defining the decision surface is obtained using the training process of equation (7) or (8) for the sequence of training email vectors $x_i = (freq_1(E), \ldots, freq_m(E_i))$, each associated with the training label $y_i = 1$ for an example of a Spam email and $y_i = -1$ for each allowed email, i=1, . . . , n.

Other applications for the SVM include continuous speech recognition, image classification, particle identification for high energy physics, object detection, combustion engine knock detection, detection of remote protein homologies, 3D object recognition, text categorisation (as discussed above), time series prediction and reconstruction for chaotic systems, hand written digit recognition, breast cancer diagnosis and prognosis based on breast cancer data sets, and decision tree methods for database marketing.

Many modifications will be apparent to those skilled in the art without departing from the scope of the present invention as herein described with reference to the accompanying drawings.

The invention claimed is:

1. A training method for a support vector machine to perform data classification for a relationship between a training set of data, the method executed by a computer system, including executing an iterative process by a processor on the training set of data read from a data input device to determine parameters defining said machine represented by:

$$y = sgn(w \cdot x + \beta b),$$

where y is the classification output which is output by a data output device, x is the input data read from the data input device, β is 0 or 1, the vector w and bias b, being parameters defining a decision surface, said iterative process being executed by the processor based on a derivative optimization function for said parameters and said data set.

2. A method as claimed in claim 1, wherein said method is adapted for generation of a kernel learning machine.

3. A method as claimed in claim 1, wherein said method is adapted to generate a regularisation network.

4. A method as claimed in claim 1, wherein for classification, said parameters are obtained by minimizing the differentiable objective function:

$$\Psi(w, b) = \frac{1}{2} w \cdot w + C \sum_{i=1}^{n} L(1 - y_i (w \cdot x_i + \beta b))$$

where $C > 0$ is a free parameter, $x_i$, $i=1, \ldots, n$, are data points of the training set, $y_i = \pm 1$, $i=1, \ldots, n$, are known labels, n is the number of data points and L is a differentiable loss function such that $L(\xi) = 0$ for $\xi < 0$.

5. A method as claimed in claim 4, wherein said iterative process operates on a derivative of the objective function Ψ until the vectors converge to a vector w for the machine.

6. A method as claimed in claim 1, wherein for ε-insensitive regression, the vector w and bias b, being parameters defining a decision surface, are obtained by minimizing the differentiable objective function $$\Psi(w, b) = \frac{1}{2} w \cdot w + C \sum_{i=1}^{n} L(|y_i - w \cdot x_i + \beta b| - \varepsilon)$$

where the $\varepsilon > 0$ is a free parameter, $C > 0$ is a free parameter, β is 0 or 1, $x_i$, $i=1, \ldots, n$, are the training data points of the data set, $y_i = \pm 1$, $i=1, \ldots, n$, are known labels, n is the number of data points and L is a differentiable loss function such that $L(\xi) = 0$ for $\xi < 0$.

7. A support vector machine for performing a classification task, the support vector machine comprising:
an input device reading training data points;
a processor calculating classification output y for the classification task given by $$y = y(x) = \sum_{i=1}^{n} y_i \alpha_i k(x, x_i) + \beta b$$

where $x \in R^n$ is a data point to be classified and $x_i$, are the training data points, k is a kernel function, and $a_i$, are coefficients determined by the processor calculating $$a_i = CL'(1 - y_i \eta_i \beta b)$$

where $L'(\xi)$ is the derivative of the loss and the values $n_i$, are determined by the processor iteratively executing $$\eta_j^{t+1} = \eta_j^t - \delta \left( \eta_j^t - C \sum_{i=1}^{n} L'(1 - y_i \eta_i^t - y_i \beta b^t) y_i k(x_i, x_j) \right),$$

-continued $$b^{t+1} = \beta b^t + \delta \beta C \sum_{i=1}^{n} L'(1 - y_i \eta_j^t - y_i \beta b^t) y_i.$$

where $\xi > 0$ is a free parameter representing a learning rate and/or, by the processor iteratively executing in the homogeneous case (β=0):

$$\eta_j^{t+1} = C \sum_{i=1}^{n} L'(1 - y_i \eta_j^t) y_i k(x_i, x_j)$$

where $i, j=1, n$, n are the number of data points, t represents an iteration and L' is the derivative of a loss function L.

8. A support vector machine for ε-regression, the support vector machine comprising:
a data input device reading training data points; and
a processor calculating an a classification output y given by $$y(x) = \sum_{i=1}^{n} \beta_i k(x, x_i) + \beta b$$

where $x \in R^m$ is a data point to be evaluated and $x_i$, are the training data points, k is a kernel function, β=0 or 1, and $\beta_i$, and bias b are coefficients determined by the processor calculating $$\beta_i = CL'(|y_i - n_j - \beta b| - \varepsilon) sgn(y_i - r_i - \beta b)$$

where ε is a free parameter and the values $n_j$ and b are determined by the processor iteratively executing $$\eta_j^{t+1} = \eta_j^t - \delta \left( \eta_j^t - C \sum_{i=1}^{n} L'(|y_i - \eta_i^t - \beta b| - \varepsilon) sgn(y_i - \eta_i^t - \beta b) k(x_i, x_j) \right)$$

$$b^{t+1} = b^t + \delta \beta C \sum_{i=1}^{n} L'(|y_i - \eta_i^t - \beta b| - \varepsilon) sgn(y_i - \eta_i^t - \beta b)$$

where $\xi > 0$ is a free parameter representing a learning rate and/or, by the processor iteratively executing in the homogeneous case (β=0):

$$\eta_j^{t+1} = C \sum_{i=1}^{n} L'(|y_i - \eta_j^t| - \varepsilon) sgn(y_i - \eta_i^t) k(x_i, x_j)$$

where $i, j = 1, \ldots, n$, n being the number of data points and t represents an iteration and L' is the derivative of a loss function L.

9. A regularization network of a computer system comprising:
a data input device for reading a set of training data points, x;
a processor calculating a classification output y by solving the equation $$y(x) = \sum_{i=1}^{n} \beta_i k(x, x_i) + \beta b$$

where $x \in R^m$ is a data point to be evaluated and $x_i$, are training data points of the set of training data points, k is a kernel function, $\beta = 0$ or $1$, and $\beta_i$ and bias b are coefficients: and wherein the processor determines the coefficients $\beta_i$ by the equation:

$$\beta_i = CL'(|y_i - n_i - \beta b| - \epsilon)$$

where $\epsilon$ is a free parameter and the values $n_j$, and b are determined by the processor iteratively executing $$n_j^{t+1} = n_j^t - \delta \left( n_j^t - C \sum_{i=t}^{n} L'(|ly_i - n_j^t - \beta b|)k(\tilde{x}_i, \tilde{x}_j) \right)$$

$$b^{t+1} = b^t + \delta \beta C \sum_{i=1}^{n} L'(|ly_i - n_j^t - \beta b|)$$

where $\delta > 0$ is a free parameter representing a learning rate and/or, by the processor iteratively executing in the homogeneous case ($\beta = 0$):

$$n_j^{t+1} = C \sum_{i=t}^{n} L'(ly_i - n_j^t - \beta b)k(\tilde{x}_i, \tilde{x}_j)$$

where i, j=1, ..., n, n being the number of data points and t represents an iteration and L' is the derivative of a loss function L.

10. A non-transitory computer readable medium having stored thereon instructions for performing data classification for the relationship between a training set of data, the stored instructions comprising machine executable code, which when executed by at least one machine processor, causes the machine to:

execute an iterative process on the training set of data to determine parameters defining said machine represented by:

$$y = sgn(w.x + \beta b),$$

where y is the output which is output by a data output device, x is the input data read from the data input device, $\beta$ is 0 or 1, the vector w and bias b, being parameters defining a decision surface, said iterative process being executed on a derivative optimization function for said parameters and said data set.

* * * * *

UNITED STATES PATENT AND TRADEMARK OFFICE
CERTIFICATE OF CORRECTION

| | |
|---|---|
| PATENT NO. | : 8,005,293 B2 |
| APPLICATION NO. | : 10/257929 |
| DATED | : August 23, 2011 |
| INVENTOR(S) | : Kowalczyk et al. |

It is certified that error appears in the above-identified patent and that said Letters Patent is hereby corrected as shown below:

On the Title Page:

Item (73) Assignee:

Please delete "Telestra New Wave Pty Ltd" and insert -- Telstra Corporation Limited --

Signed and Sealed this

Seventh Day of February, 2012

David J. Kappos
*Director of the United States Patent and Trademark Office*